(12) United States Patent
Stoloff et al.

(10) Patent No.: US 6,488,507 B1
(45) Date of Patent: Dec. 3, 2002

(54) PORTABLE SURGICAL TRAINER

(75) Inventors: David Stoloff, Whitehouse Station, NJ (US); Albert M. Destefano, Jr., Raritan, NJ (US); Curtis Tom, Menlo Park, CA (US)

(73) Assignee: Ethicon, Inc., Somerville, NJ (US)

( * ) Notice: Subject to any disclaimer, the term of this patent is extended or adjusted under 35 U.S.C. 154(b) by 0 days.

(21) Appl. No.: 09/450,911

(22) Filed: Nov. 29, 1999

(51) Int. Cl.[7] .............................................. G09B 23/28
(52) U.S. Cl. ...................................................... 434/272
(58) Field of Search ................................ 434/262, 267, 434/272, 273; 600/313, 562, 101, 183; 604/22; 607/139

(56) References Cited

U.S. PATENT DOCUMENTS

| | | | |
|---|---|---|---|
| 2,871,579 A | | 2/1959 | Niiranen et al. ............ 434/267 |
| 2,995,832 A | | 8/1961 | Alderson ..................... 434/262 |
| 4,481,001 A | * | 11/1984 | Graham ....................... 434/267 |
| 4,773,864 A | * | 9/1988 | Holt ............................ 434/262 |
| 4,789,340 A | * | 12/1988 | Zikria .......................... 434/272 |
| 5,149,270 A | * | 9/1992 | McKeown .................. 434/262 |
| 5,320,537 A | * | 6/1994 | Watson ........................ 434/272 |
| 5,358,408 A | * | 10/1994 | Medina ........................ 434/262 |
| 5,403,191 A | * | 4/1995 | Yuason ........................ 434/262 |
| 5,425,644 A | | 6/1995 | Szinecz ....................... 434/268 |
| 5,472,345 A | * | 12/1995 | Eggert ......................... 434/273 |
| 5,620,326 A | | 4/1997 | Younker |
| 5,722,836 A | * | 3/1998 | Younker ..................... 434/272 |
| 5,873,863 A | * | 2/1999 | Komlosi ..................... 604/259 |
| 5,951,301 A | * | 9/1999 | Younker ..................... 434/272 |
| 5,971,767 A | * | 10/1999 | Kaufman .................... 434/267 |

FOREIGN PATENT DOCUMENTS

| | | |
|---|---|---|
| DE | 43 06 630 C2 | 12/1995 |
| EP | 0 611 469 Ba | 3/1994 |

OTHER PUBLICATIONS

Karl Storz–Endoskope; Swolin Cervix Cannula; p. HYS–ACC 7B.
Karl Storz–Endoskope; Wallwiener–Bastrt Hystero Trainer; pps HYS–ACC 9A–10A.
Karl Storz–Endoskope; Wallwiener–Bastert Hystero/Fallopo Trainer; pps HYS–ACC 11A–12A.

* cited by examiner

*Primary Examiner*—Derris H. Banks
*Assistant Examiner*—Kurt Fernstrom

(57) ABSTRACT

A portable enclosure for simulating surgical conditions using endoscopic instruments. The enclosure contains a pump and fluid reservoir and a canister in which an animal or synthetic tissue sample is placed within an adjustable cavity. The pump circulates fluid to an endoscopic instrument external to the enclosure enabling an individual to practice either monopolar or bipolar instrument techniques within the cavity and under conditions that simulate real life operating conditions.

3 Claims, 7 Drawing Sheets

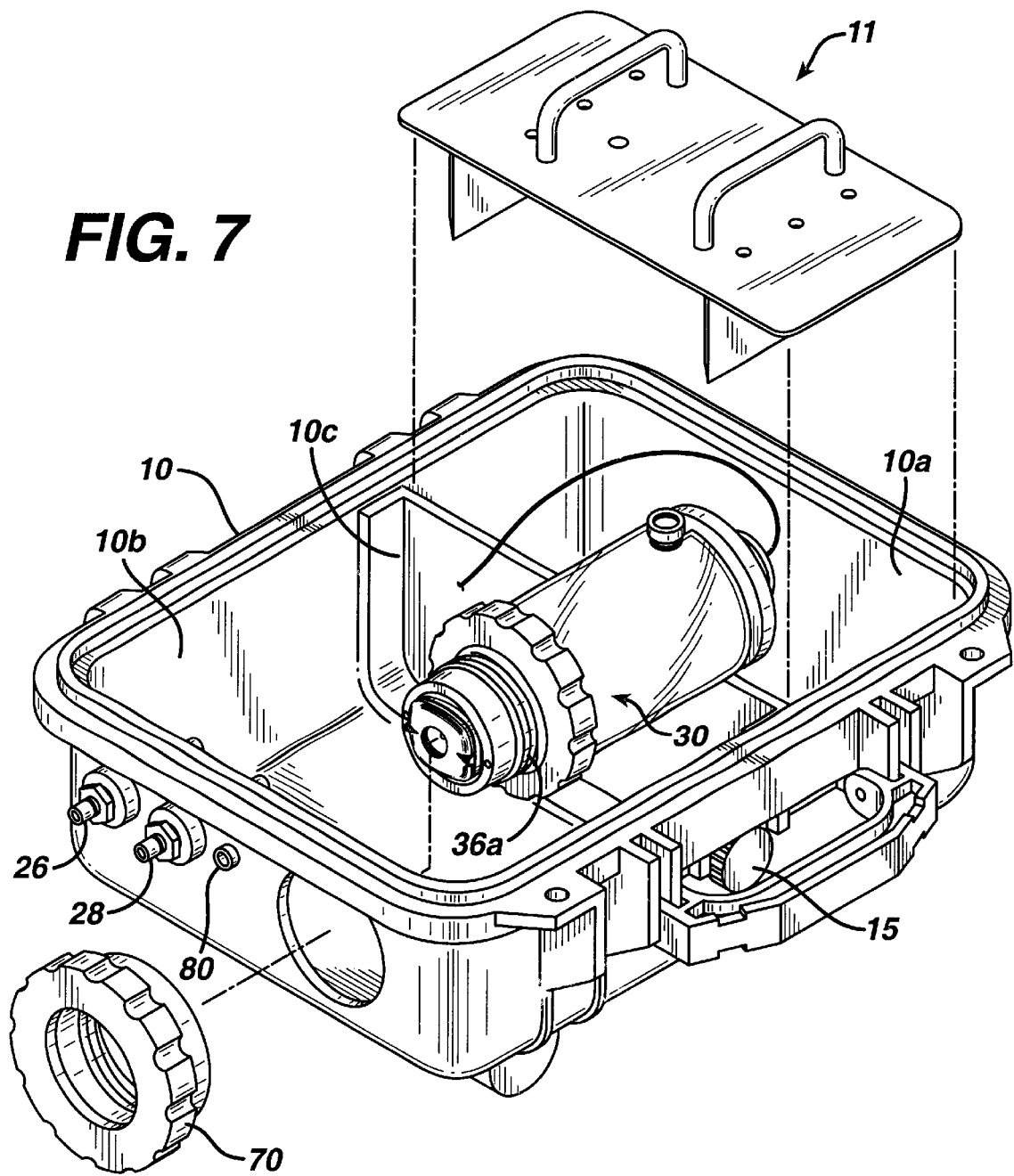

PORTABLE SURGICAL TRAINER

BACKGROUND INFORMATION

1. Field of the Invention

The present invention relates generally to a surgical trainer and in particular it relates to a simulator that incorporates features to simulate visual and manipulation conditions for training surgeons in surgical procedures such as endoscopy and particularly hysteroscopy.

2. Background of the Invention

New surgical instruments and techniques have been developed to make surgery less invasive to the patient thus eliminating the need to make incisions requiring lengthy healing time. Endoscopes are presently used for diagnostic purposes and therapeutic treatment of the interior of a hollow viscous. Endoscopic surgery is generally performed in the presence of a distension medium. The distension medium may be either a liquid or a gas. There are many different uses for endoscopes, and frequently the endoscope design is varied, depending on its use, to optimize the performance of the endoscope for its intended purpose. Endoscopes having integral working channels are generally employed when the body cavity may be accessed through a natural body opening. For example, a hysteroscope is used to access the intrauterine cavity of the uterus via the cervical canal, and a urethroscope is used to access the prostate gland and the bladder via the urethra. Other types of endoscopes include the upper endoscopes for examination of the esophagus, stomach and duodenum, colonoscopes for examining the colon, angioscopes for examining the blood vessels and heart, bronchoscopes for examining the bronchi, laparoscopes for examining the peritoneal cavity, arthroscopes for examining joint spaces and sigmoidoscopes for examining the rectum and sigmoid colon.

In operation, the surgeon is able to insert either a semirigid or flexible operating instrument through a working channel to perform any number of surgical procedures as viewed by the eyepiece connected to a viewing scope. Representative operating instruments include scissors, biopsy and grasping forceps, ball electrode, optical scissors and an optical punch.

Many endoscopic surgeries require incision and dissection of tissue using electrocauterization. The endoscopic electrocautery device may be either monopolar or bipolar in nature.

Surgeon training has represented a major problem encountered in the implementation of new surgical instruments and techniques. Performing delicate operations on patients without having the particular tissue or organ exposed requires unnatural hand-eye coordination. Conventional techniques for teaching endoscopic surgery procedures involve the use of animal specimens. The use of laboratory animals for surgical training, however, is very expensive and is the subject of public debate. Further, animal specimens have a short viability on the operating table, and thus provide the trainee with a limited period of time in which to practice repeated techniques. In addition, it would be preferable to have a portable trainer that can be used in a physician's office or in a clinical setting.

Representative training simulators are the SEMM PELVI-TRAINER and Hystero/Fallopo Trainer manufactured by Storz-Carl Storz--Endoskope. The SEMM PELVI-TRAINER simulator consists of a lower tray on which an object representing a human organ is positioned. An upper tray has puncture-simulating openings through which surgical instruments and a viewing scope are inserted. The trainee maneuvers the instrument through the opening and operates on the object.

U.S. Pat. No. 5,149,270 discloses an apparatus having a cavity in which an object simulating a human organ is mounted for performing the practice procedure. The cavity is closeable to outside view or access.

U.S. Pat. No. 5,425,644 discloses an apparatus including a frame, a pump, appropriate tubing and a reservoir containing a volume of fluid. Non-living animal tissue is joined to the tubing at the outlet side of the pump and surgical personnel are permitted to conduct surgical techniques.

U.S. Pat. No. 5,620,326 discloses an anatomical simulator system including a synthetic anatomical torso resting on a base. The torso includes an internal cavity and a pneumoperitoneum wall.

All of these systems are generally bulky and complex.

Thus, there is a need for a simplified and portable videoendoscopic surgical training system that accurately simulates a surgical procedure. This invention satisfies this need by providing a simple and cost effective endoscopic trainer.

SUMMARY OF THE INVENTION

The present invention relates generally to an apparatus that provides for a portable and completely self-contained training unit to practice endoscopic procedures. In one embodiment the enclosure is no larger than a carrying bag for transporting laptop computers and the interior is divided into two compartments. The first compartment houses a submersible pump and fluid reservoir and the second compartment houses a canister having a cavity that contains an animal or synthetic tissue sample. Preferably, the size of the cavity is adjustable to accept varying sizes of tissue samples. The canister also contains an access aperture to the cavity that is accessible from the exterior of the enclosure. In operation, the pump circulates fluid to a endoscopic instrument external to the enclosure thus enabling an individual to practice either monopolar or bipolar instrument techniques within the cavity that simulate real life surgical conditions.

BRIEF DESCRIPTION OF THE DRAWINGS

FIG. 7 is a major component assembly plan of the present invention.

DETAILED DESCRIPTION OF THE INVENTION

Before explaining the present invention in detail, it should be noted that the invention is not limited in its application or use to the details of construction and arrangement of parts illustrated in the accompanying drawings and description;

the illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Figure 1:
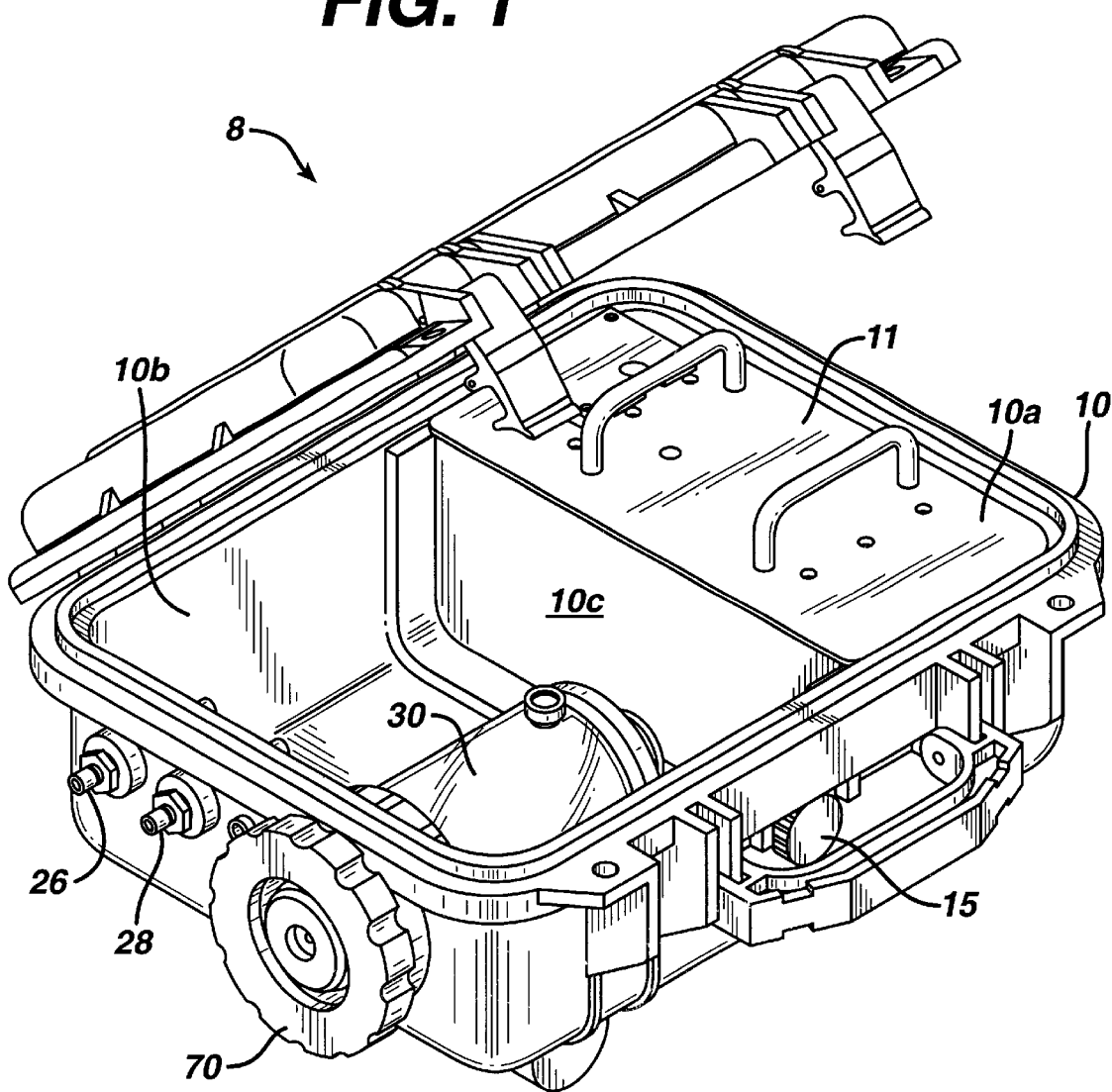
FIG. 1 is perspective view, opened for viewing the internal structure, of an apparatus of the present invention.

As shown in FIGS. 1 and 7, surgical training apparatus 8 includes a corrosive resistant enclosure 10, for example fiberglass, that houses a pump assembly 11 and a canister 30 that contains an animal or synthetic tissue sample. Enclosure 10 is divided into two compartments 10a and 10b, separated by a bulkhead 10c that is sealed to prevent fluid leakage between the compartments. The enclosure 10 can be sized to be no larger than a carrying case for a laptop computer. Such a design facilitates the training apparatus to be easily transported and allow instrument demonstration/training within a doctor's office.

Figure 2:
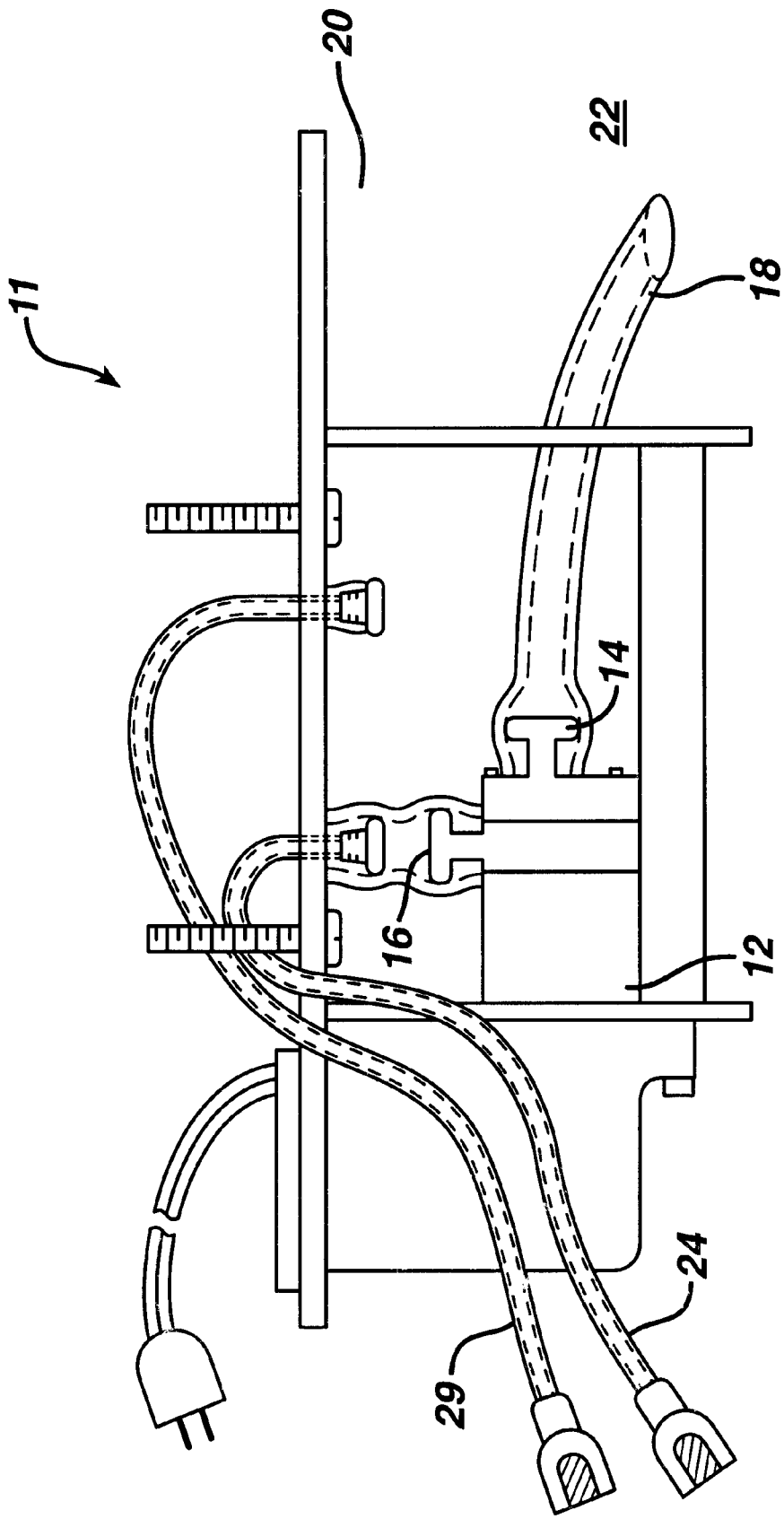
FIG. 2 is an elevation view of the pump and fluid reservoir of the present invention.

As shown in FIG. 2, pump assembly 11 includes a pump 12 having a pump inlet 14 and pump outlet 16. Inlet tubing 18 is attached to inlet 14 by known means, for example, a hose clamp or press fit. Tubing 18 communicates with a fluid reservoir 20 which is adapted to receive and hold fluid 22 such as a saline, lactated ringers solution, or any electrolyte or non-electrolytic solution. Outlet tubing 24 is attached to pump outlet 16, again by known means. Tubing 24 communicates with an outflow connector 26 attached to enclosure 10. Outflow connector 26 fluidly communicates with the inflow port of an endoscopic instrument (not shown), as is generally known to those skilled in the art. The fluid may be used to distend the tissue cavity as is common in some endoscopic procedures. Fluid removed from the tissue sample cavity is pumped out through the endoscopic instrument through inflow connector 28 and into compartment 10a via hose 29. In the preferred embodiment, pump 12 is a submersible pump, model no. 1A-MD-1 as manufactured by March Mfg. Inc. of Glenville, Ill.

Figure 4:
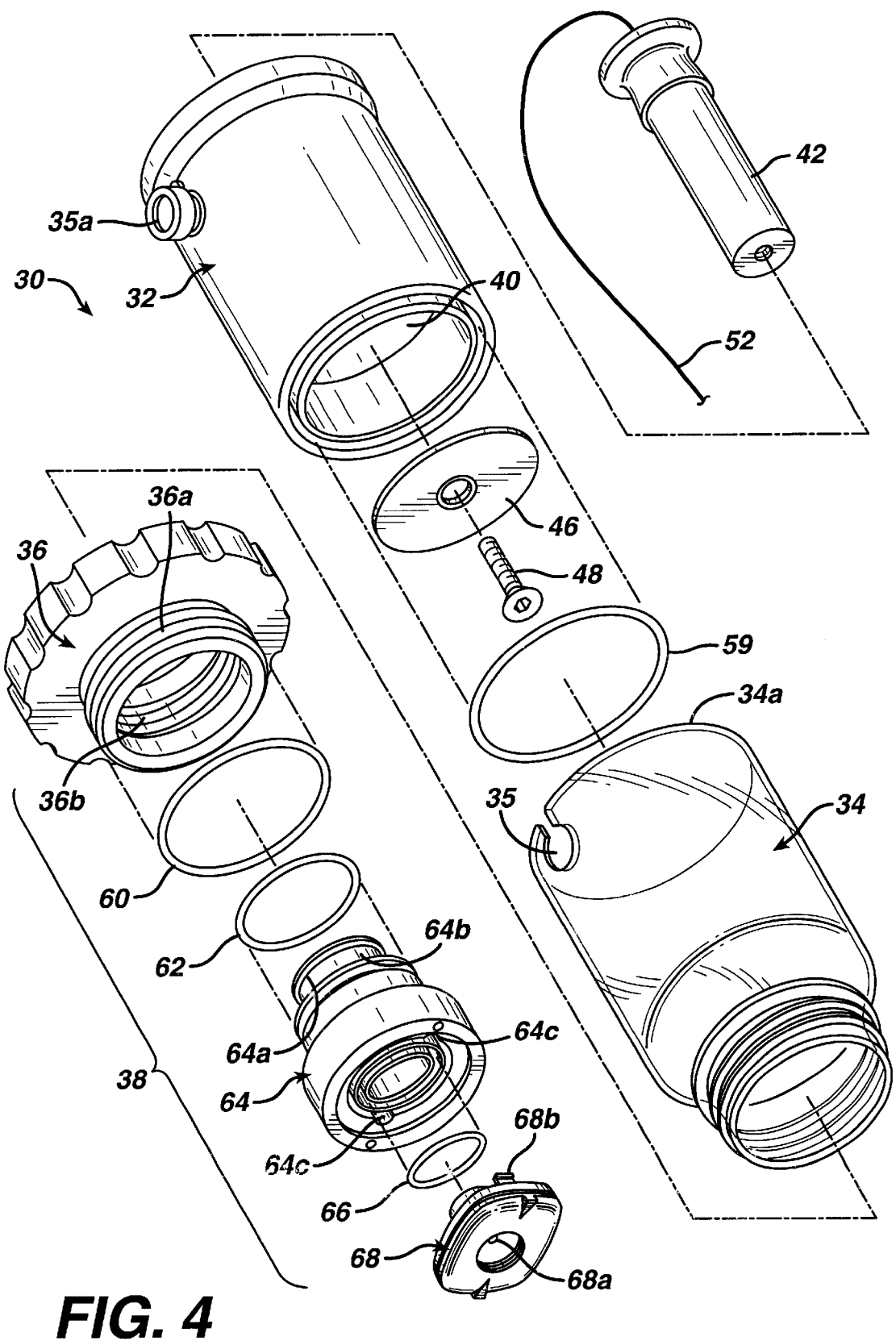
FIG. 4 is an assembly plan of the canister of the present invention.
Figure 5:
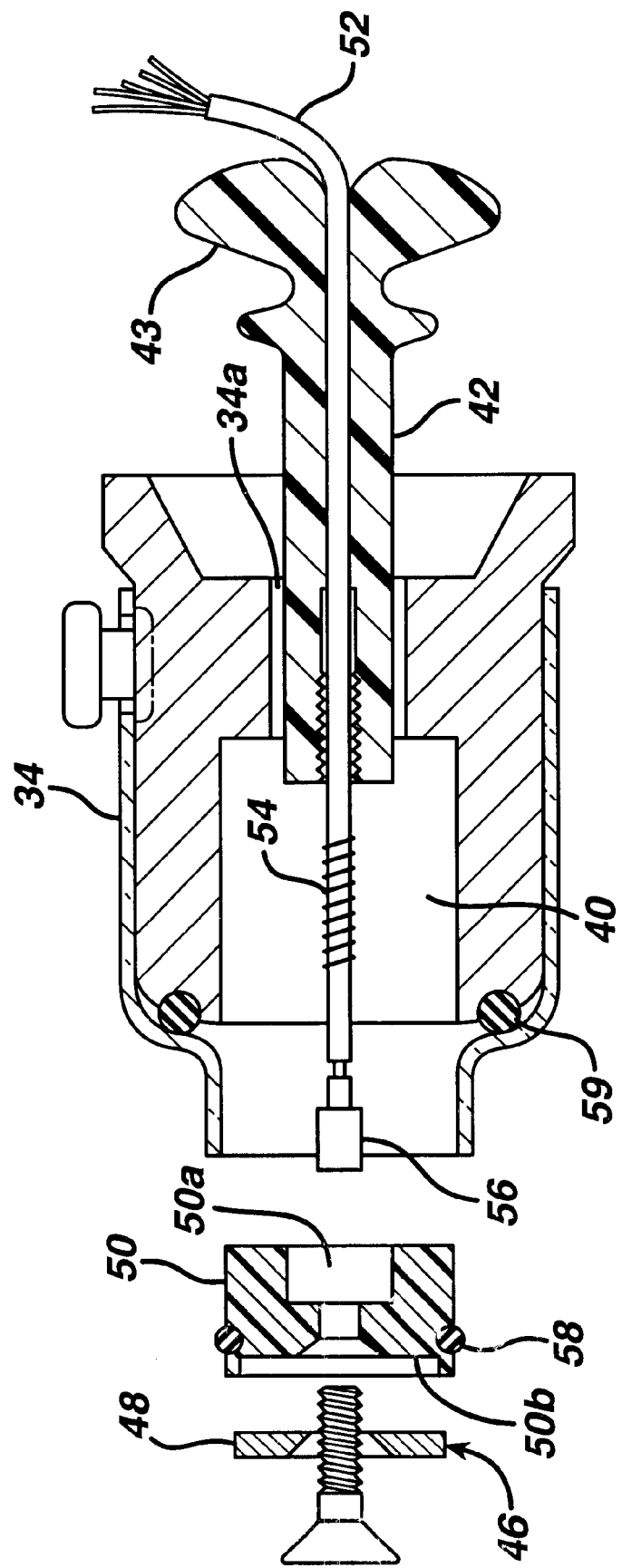
FIG. 5 is a cut-away view of the inner canister of the present invention.

Located in compartment 10b is a canister 30 for accepting animal tissue or a synthetic replication thereof. Referring to FIGS. 4 and 5, canister 30 comprises an inner housing 32, which slidably engages an outer housing 34. Housing 34 also threadedly couples to a seal port 38.

Figure 3:
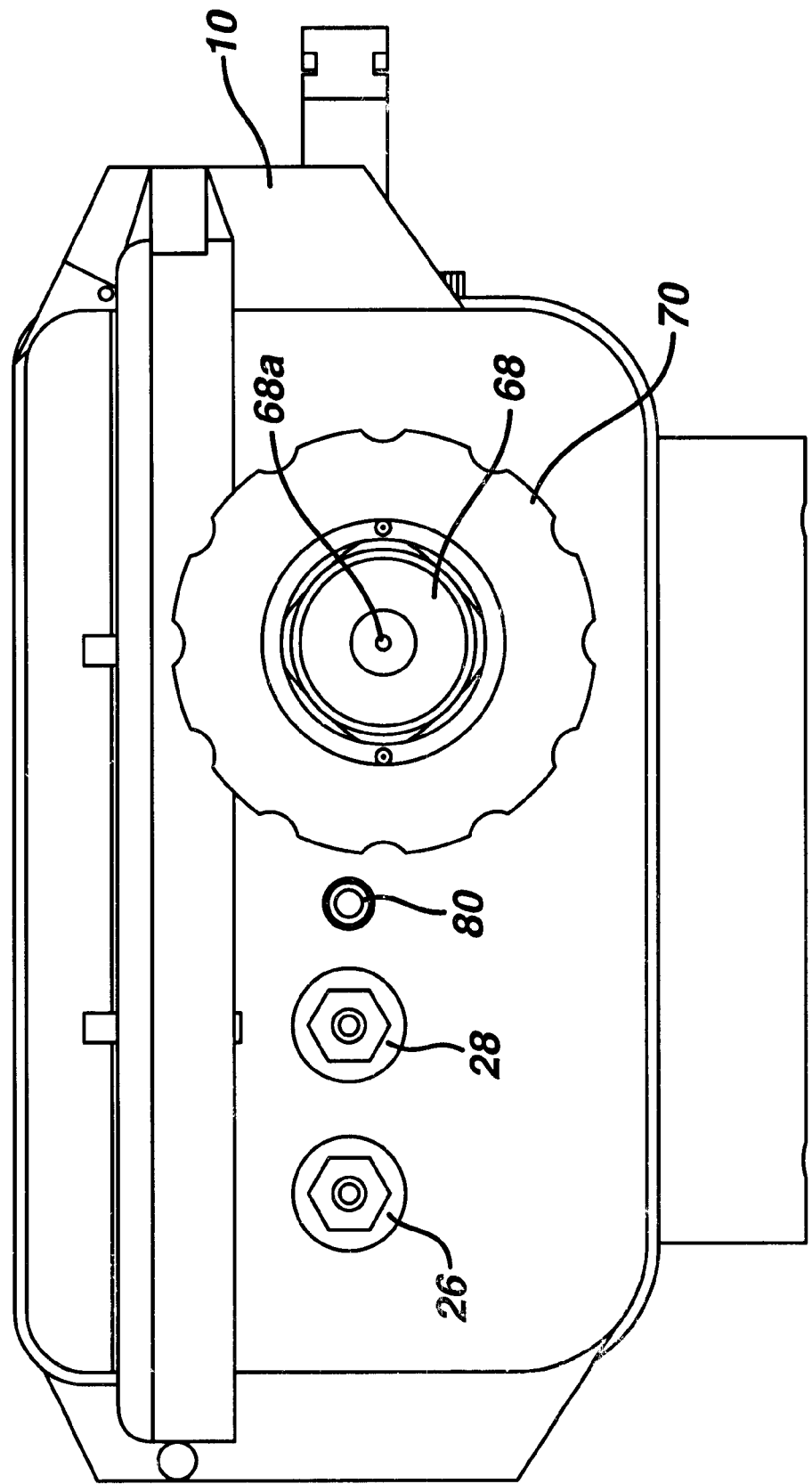
FIG. 3 is an elevation view of the operational face of an apparatus of the present invention.

Inner housing 32 defines an adjustable cavity 40 that accepts an animal or synthetic tissue sample. Outer housing 34 contains a bore 34a that accepts a plunger element 42. Plunger 42, combination with piston 50, varies the volume of cavity 40 so that variably sized tissue samples may be used with the invention. Plunger 42 further provides for the electrical connections that make the instant invention capable of training personnel on monopolar electrosurgical instruments. The distal end of plunger 42 has a bore and threaded section that accept a spring 54 and contact head 56. Spring 54 slides over a wire 52 that inserts through a center bore within plunger 42 and which is soldered to contact head 56. During the use of monopolar electrosurgical instruments, wire 52 is connected to a grounding pad via electrical connector 80 (see FIGS. 3 and 7), as is well known to those skilled in the art. Piston 50 comprises a bore 50a at its proximal end that accepts the distal portion of plunger 42. The distal end of piston 50 is a second bore 50b that accepts an electrically conducting washer 46, preferably stainless steel that in operation contacts the tissue sample. A screw 48, preferably, stainless steel, attaches washer 46 to plunger 50 and threadedly engages the distal end of plunger 42 and makes contact with contact head 56. Accordingly, electrical conductivity is maintained from the wire 52 to contact head 56 to screw 48 to washer 46. The user is able to define the volume size of cavity 40 by grabbing handle 43 and moving plunger 42 into or out from cavity 40. O-ring 58 positioned on piston 50 provides a liquid tight fit of piston 50 within cavity 40. Inner housing 34, plunger 43 and piston 50 are all made out of non-electrically conducting material, preferably, plastic.

As shown in FIG. 4, inner housing 32 slides within outer housing 34. Preferably, outer housing 34 is a nalgene bottle that is modified to include a cut slot and bore 35 which accepts a spring pin 35a located on inner housing 32 to securely fasten inner housing 32 within outer housing 34. An O-ring 59 is included as shown in order to provide a liquid-tight seal of the housings.

Seal port 38 includes a connector 36, which comprises outside threads 36a and inside threads 36b, O-rings 60, 62 and 66, cap adapter 64 and cap 68. Cap 68 is a conventional trocar seal that provides an aperture 68a for access to a tissue sample in cavity 40. A useful trocar seal is the universal OneSeal reducer cap, part number 1Seal, sold by Ethicon Endo-Surgery, Inc. of Cincinnati, Ohio.

Figure 6:
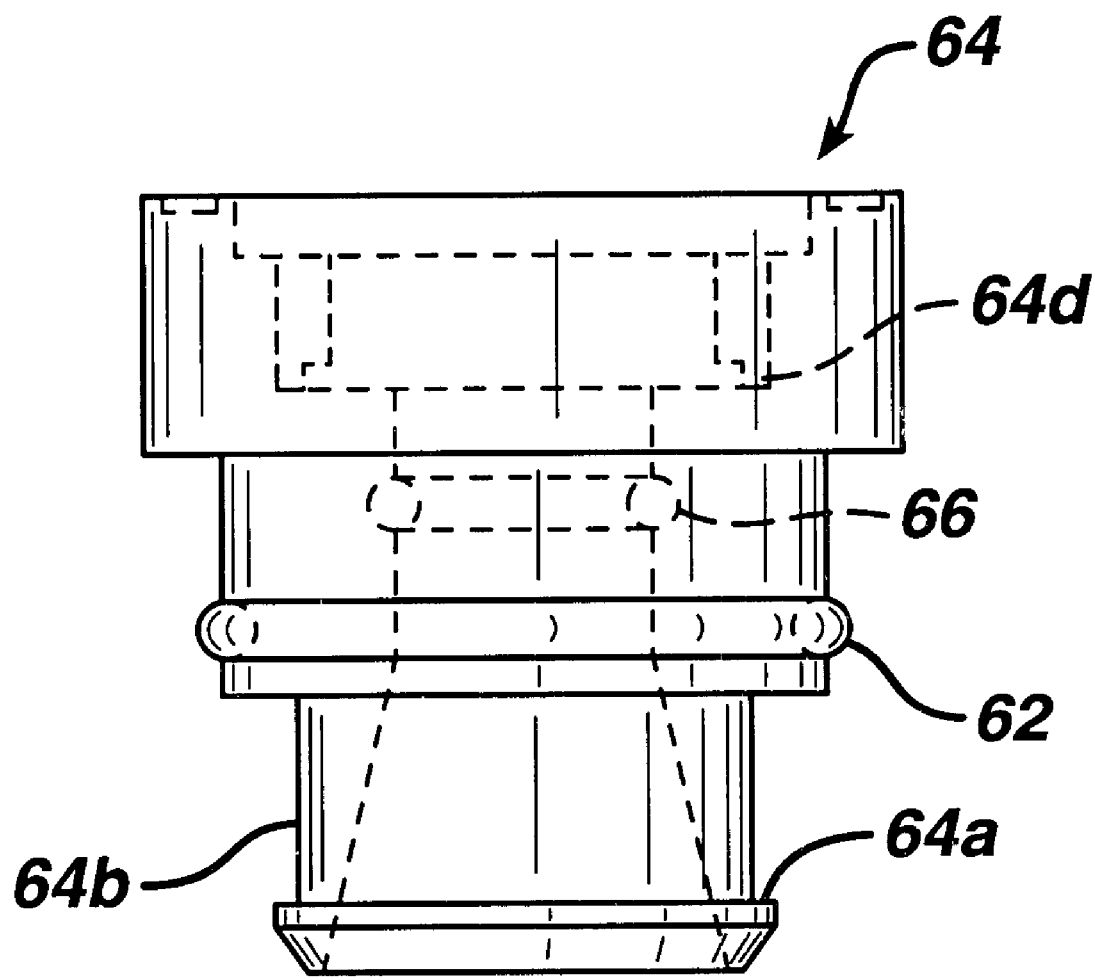
FIG. 6 is an elevation view of the cap adapter or the present invention, showing the internal access in phantom.

Connector 36 screws onto outer housing 34 via inside threads 36b. O-ring 60 provides for a secure, leak-free connection. FIG. 6 illustrates cap adapter 64, which press fits within connector 36 as shown in FIG. 4. O-ring 62 provides for a secure, leak-free connection. Cap adapter 64 defines a lip region 64a and a tissue attachment surface 64b. Cap adapter 64 also comprises slots 64c for accepting tab portions 68b of cap 68; tab portions 68b are rotated within channel 64d to provide a secure fit of cap 68 to cap adapter 64. O-rings 62 and 66 provide for a secure, leak-free fit.

Referring to FIGS. 2 and 7, pump assembly 11 (as completely illustrated in FIG. 2) is placed within compartment 10a, and canister 30 is attached to housing via connector 70 threadedly connected to outside threads 36a as shown. Enclosure 10 may also include an adjustable vent knob 15 to allow venting of the enclosure during operation or transportation. To complete the installation tubings 24 and 29 connect to their respective connectors 26 and 28, which are also connected to the inlet and outlet ports of an endoscopic instrument.

Referring also to FIGS. 4 and 6, the instrument including viewing scope and other instruments to be utilized to practice a procedure are inserted through access opening 68a and into cavity 40. In one preferred embodiment, cavity 40 contains a tissue sample that is representative of a cavity of an organ, such as a uterus. A pig's bladder may be used to simulate the uterus. In addition, another piece of tissue, such as a heart muscle may be sewn within the bladder to simulate a fibroid, polyp, uterine septa or intrauterine adhesion that the surgeon is required to biopsy and/or remove. An endometrial resection may be simulated with this model. Alternatively, a synthetic tissue sample may be employed as disclosed on page 1060 of Research Disclosure, August 1999 entitled *A Synthetic Surrogate for Demonstrating the Thermal Spread of Electrosurgical and Ultrasonic Surgical Instruments*. The bladder slips around lip 64a and is securely fastened about attachment area 64b using any conventional attachment means such as a tie-wrap. During the training procedure, the bladder is out of view of the surgeon, which requires the surgeon to manipulate and use the instruments for a procedure under conditions simulating an endoscopic procedure.

Although the present invention has been described in detail by way of illustration and example, it should be understood that a wide range of changes and modifications could be made to the preferred embodiments described above without departing in any way from the scope and spirit of the invention. Thus, the described embodiments are to be considered in all aspects only as illustrative and not restrictive, and the scope of the invention is, therefore, indicated by the appended claims rather than the foregoing description. All changes that come within the meaning and range of equivalency of the claims are to be embraced within their scope.

We claim:

1. A self-contained training unit to practice endoscopic procedures comprising:
   a) an enclosure having a first compartment housing a pump and fluid and a second compartment housing a canister, the canister comprising:
      i) a cavity;
      ii) at least one aperture providing entry into said cavity for inserting an endoscopic instrument to practice a surgical procedure;
      iii) mounting means for mounting a sample simulating an animal organ within the cavity; and
      iv) adjusting means for adjusting the volume of the cavity from a first volume to a second volume.

2. The training unit of claim 1 wherein the enclosure further comprises at least one aperture in a corresponding relationship with at least one aperture providing entry into said cavity.

3. A self-contained training unit to practice endoscopic procedures comprising:
   an enclosure having a first compartment housing a pump and fluid and a second compartment housing a canister, the canister comprising:
      a) a cavity;
      b) at least one aperture providing entry into said cavity for inserting an endoscopic instrument to practice a surgical procedure; and
      c) adjusting means for adjusting the volume of the cavity from a first volume to a second volume.

* * * * *